United States Patent [19]

Saitoh et al.

[11] Patent Number: 4,503,438

[45] Date of Patent: Mar. 5, 1985

[54] METHOD OF ERASING MAGNETIC LATENT IMAGE IN THERMO-MAGNETIC RECORDING

[75] Inventors: Koichi Saitoh; Teruhiko Itami; Toshifumi Kimoto, all of Kanagawa, Japan

[73] Assignee: Fuji Xerox Co., Ltd., Tokyo, Japan

[21] Appl. No.: 411,187

[22] Filed: Aug. 25, 1982

[51] Int. Cl.³ .............................................. G01D 15/12
[52] U.S. Cl. ...................................... 346/74.4; 430/39
[58] Field of Search ................ 346/74.2, 74.4; 360/59; 430/39, 348, 349

[56] References Cited

U.S. PATENT DOCUMENTS 3,611,415 10/1971 Nelson .............................. 360/59 X
3,832,718 8/1974 Berkowitz et al. ................. 346/74.4
4,340,914 7/1982 Hanaoka ............................... 360/59

Primary Examiner—Thomas H. Tarcza
Attorney, Agent, or Firm—Sughrue, Mion, Zinn, Macpeak and Seas

[57] ABSTRACT

A method of erasing a magnetic latent image includes the steps of simultaneously applying an external magnetic field and heat to a thermally magnetized layer of a magnetic recording medium.

11 Claims, 16 Drawing Figures

METHOD OF ERASING MAGNETIC LATENT IMAGE IN THERMO-MAGNETIC RECORDING

BACKGROUND OF THE INVENTION

This invention relates to a demagnetizing method for a thermo-magnetic recording operation.

In magnetic recording methods, a magnetic latent image is formed in a magnetic material by magnetization and is then made visible by magnetic toner particles, namely, magnetization detection type coloring particles which include magnetic particles in macromolecular resin, for instance, and which are affected by a magnetic field. The visible image thus obtained is transferred onto a sheet or the like by an electrostatic or magnetic method, and is then fixed by heat or pressure.

The same process is again carried out when the magnetic latent image carrier, namely, the magnetic recording medium, after being subjected to magnetic toner removal, is directly moved to the next developing cycle, or when, with the magnetic latent image erased, a new latent image has been formed.

A variety of methods of forming magnetic latent images have been proposed for the above-described magnetic recording method. Among these methods, the so-called thermo-magnetic recording method in which a magnetic latent image is formed according to a thermal input is excellent in that an inexpensive heating head array can be used to form the latent image.

With respect to latent image formation methods for thermo-magnetic recording and the thermo-magnetic recording medium used therein, the present applicant has proposed a magnetic recording method which is excellent in image quality when the latent image is visualized with toner particles, without using an external bias magnetic field, using a thermo-magnetic recording method, especially a thermal residual magnetization method (cf. Japanese Patent Application No. 37865/1981).

This invention provides a magnetic latent image erasing method which can be satisfactorily employed with the thermo-magnetic recording method disclosed by the aforementioned Japanese patent application.

As conducive to a full understanding of this invention, the thermo-magnetic recording method proposed by the application will be briefly described.

FIG. 1 is an explanatory diagram for describing the recording medium which is employed in the thermo-magnetic recording method.

The recording medium 1, as shown in FIG. 1(a), is made up of a non-magnetic base layer 1, a first magnetic layer 2 which is magnetized in advance, thus having a magnetization pattern 5, a non-magnetic intermediate layer 3, and a second magnetic layer 4.

The non-magnetic intermediate layer 3 may be eliminated as the case may be. A protective layer (not shown) may be formed on the surface of the second magnetic layer.

FIG. 1(a) shows the magnetic state of the recording medium before the input of the thermal pattern. That is, a repetitive magnetization pattern as indicated at 5 is provided over the entire first magnetic layer 2.

In this case, it can be considered that the magnetic flux 6 which is produced from the magnetization pattern 5 is distributed in the intermediate layer 3 and the second magnetic layer 4. However, the magnetic field H due to the magnetic flux which acts on the second magnetic layer is selected so as to be smaller than the coercive field $HC(T_0)$ at a temperature $T_0$ which is, for instance, the temperature of the environmental atmosphere when no thermal pattern is applied to the second magnetic layer.

Accordingly, in the case of FIG. 1(a) the magnetic recording medium contains no image data.

A thermal pattern is then formed on the second magnetic layer 4 of the magnetic recording medium by selectively exposing the latter to light, by allowing the same to contact a thermal head, or by applying a laser beam spot to the same. In this case, in the medium, the high temperature state is represented by a temperature $T_2$, and the low temperature state is represented by a temperature $T_1$, such that, for instance $(T_0 \leq T_1 < T_2)$.

If, in this case, the second magnetic layer is made of a material whose coercive field Hc changes with temperatures as indicated in FIG. 2(a), only the high temperature portion $T_2$ is selectively subjected to residual magnetization.

FIG. 2(a) is a graphical representation indicating the temperature dependence of the coercive field, Hc, which is one of the thermo-magnetic efects. In FIG. 2(a) reference Tc designates the Curie temperature.

The thermal residual magnetization phenomenon in the invention can be described clearly with reference to FIG. 2(b). Thermal residual magnetization is a phenomenon in which, when a magnetic material is cooled down to room temperature $(=T_0 \simeq T_1)$ after being heated to an initial temperature $T_2$ under the application of an external magnetic field H (the horizontal axis of FIG. 2(b)), the magnetic material has a thermal residual magnetization of $Mr(T_2)$.

Accordingly, the process from FIGS. 1(b) to 1(c) can be described with reference to FIG. 2(b) as follows:

The magnetic field H (as indicated in FIG. 2(b)) produced by the first magnetic layer acts on the second magnetic layer 4. As the high temperature portion $T_2$ only is cooled to $T_0$ from high temperatures $T_2'$ or $T_2''$, it exhibits thermal residual magnetization of $Mr(T_2)$, $Mr(T_2')$ or $Mr(T_2'')$, while the low temperature portion $T_1$ scarcely exhibits residual magnetization.

Through the above-described operation, a magnetic latent image is formed in correspondence to the thermal pattern without applying a magnetic field from an external source.

The second magnetic layer is made of a magnetic material which exhibits the above-described thermal residual magnetization phenomenon. In this connection, it is preferable to select a magnetic material whose thermal residual magnetization occurs in a high temperature range which is relatively close to room temperature. It is more preferable to use as the second magnetic layer a dispersion coat type $CrO_2$ (chromium dioxide) magnetic layer whose Curie temperature is about 130° C., or a non-crystalline film of a rare earth metal—transition metal alloy (Tb-Fe, or Gd-Fe).

The magnetic latent image which has been formed thermo-magnetically as described above is made visible by a magnetism detecting fine powder known commercially as one-component magnetic toner powder.

After suitable treatment including a magnetic latent image visualizing step, the magnetic latent image is erased, so that the thermo-magnetic recording operation may be repeated.

In erasing the magnetic latent image, it is necessary that the magnetization pattern over the entire first magnetic layer remain and only the magnetization pattern formed on the second magnetic layer be selectively erased.

In this case, one may consider utilizing the fact that the magnetic field from a magnetic head decreased abruptly away from the head surface, as disclosed by the above noted application; i.e., one may consider using an erasing magnetic head which is energized by a high frequency power source and has a long track width.

In the above-described AC magnetic field application method in which a magnetic head having a long track width is used, the head must be considerably high in uniformity in the longitudinal direction in order that it may be brought in satisfactorily close contact with the recording medium, with a result that the head becomes high in manufacturing cost.

SUMMARY OF THE INVENTION

Accordingly, an object of this invention is to provide an alternative thermo-magnetic erasing method avoiding the above-described AC erasing method using the long magnetic head.

The foregoing object of the invention has been achieved by the provision of a method of erasing a magnetic latent image in which, according to the invention, a magnetic latent image formed on a magnetic recording medium prepared by providing at least a first magnetic layer in which a periodic magnetization pattern is formed and a second magnetic layer which can be thermally magnetized on a base layer is erased by simultaneously applying both heat and a magnetic field.

DETAILED DESCRIPTION OF THE PREFERRED EMBODIMENTS

The invention will now be described with reference to the accompanying drawings.

Figure 3:
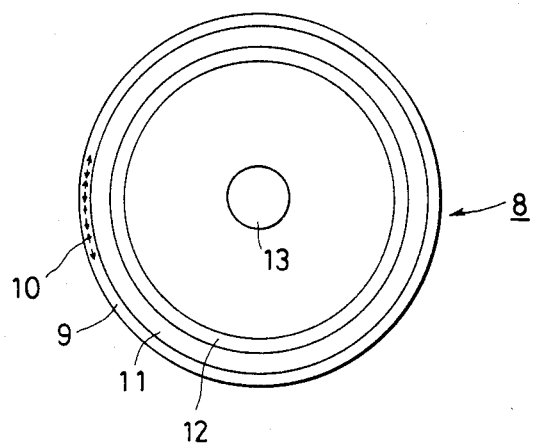
FIG. 3 is an explanatory diagram showing the construction of a demagnetizing heating roll.

FIG. 3 illustrates a demagnetizing heating roll 8 employed in the invention. The heating roll 8 is formed of a ferromagnetic layer 9 having an in-plane magnetization pattern 10 which is uniform over the surface of the roll; a heat resistant elastic layer 11 having a suitable thermal capacity; a core made of a material such as aluminum which is excellent in thermal conductivity; and a heat radiation source 13 made up of a quartz lamp.

Figure 4:
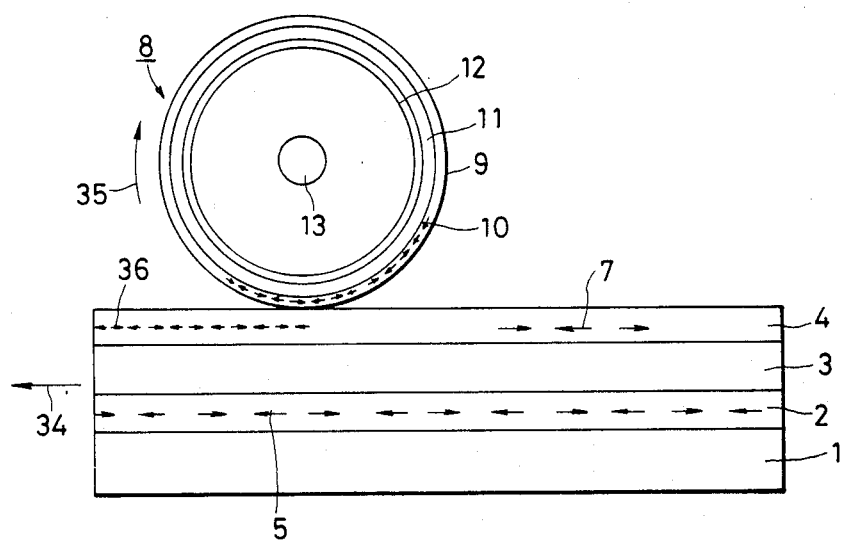
FIG. 4 is an explanatory diagram for describing a demagnetizing operation.

The operation of the demagnetizing heating roll will be described with reference to FIG. 4.

Figure 1A:
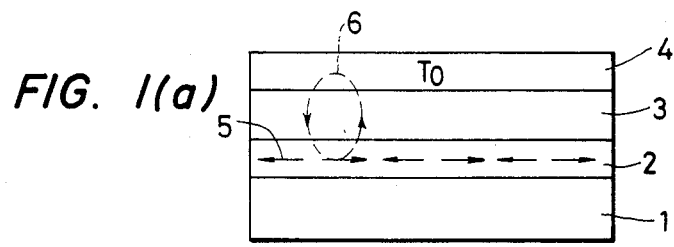
FIGS. 1(a)–1(c) are diagrams for describing the principles of forming a magnetic latent image.
Figure 1B:
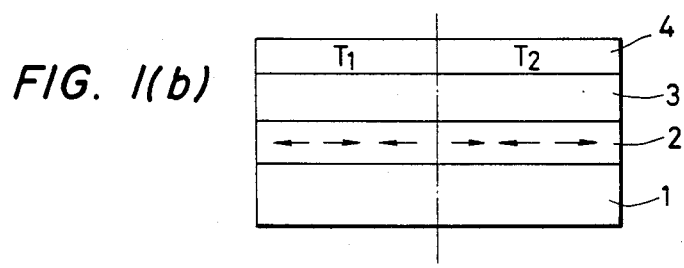
Figure 1C:
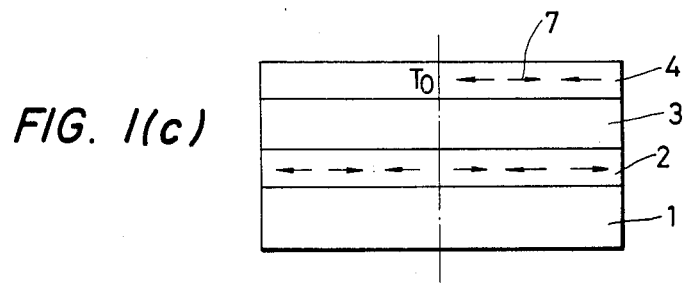
Figure 2A:
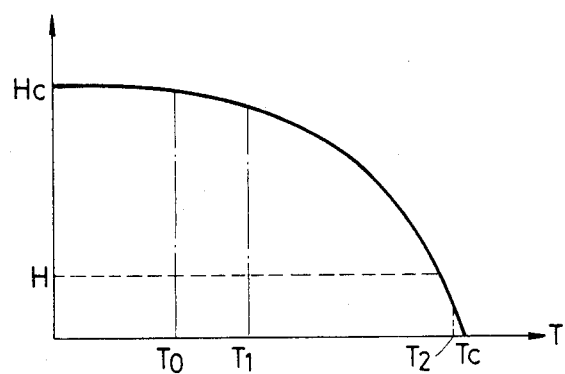
FIGS. 2(a) and 2(b) are diagrams indicating the thermo-magnetic effect in a second magnetic layer.
Figure 2B:
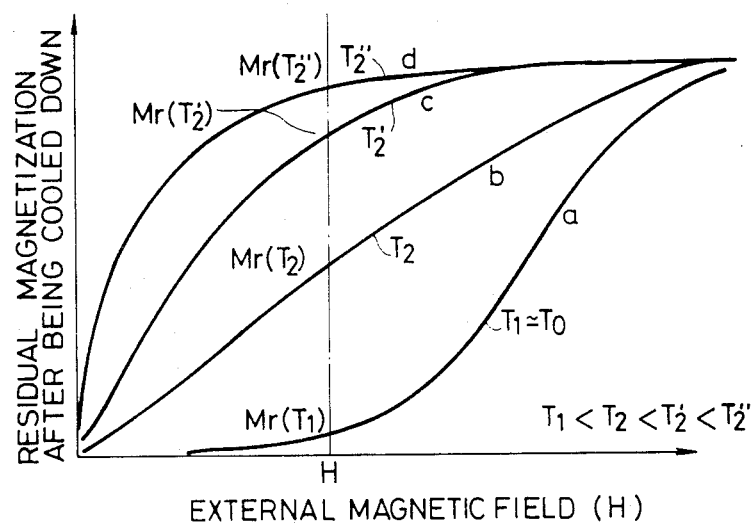

The thermo-magnetic recording medium as shown in FIG. 1 is moved in the direction of the arrow 34, and the demagnetizing heating roll 8 is turned in the direction of the arrow 35 at the same speed as the second magnetic layer 4 while being in close contact with the latter.

As the heating roll 8 is heated by the heat source 13, the temperature of the second magnetic layer 4, which is made of a thermo-magnetic material, is increased to a value at which a thermo-magnetic recording operation can be carried out.

The magnetization which remains in the second magnetic layer after the latter has been heated and magnetized by the heating roll can be described as follows: Both that portion where a magnetic latent image 7 has been formed and that portion where no magnetic latent image was formed are subjected to thermal magnetization in correspondence to the composite magnetic field of the magnetic flux from the erasing magnetization pattern provided by the erasing heating roll and that from the first magnetic layer.

According to investigations made by the present inventors, it has been found that, if the spatial modulation wavelength of the erasing magnetization pattern is selected to be smaller than the wavelength of the magnetization pattern formed in the first magnetic layer, no image visualizing particles stick due to the magnetization which remains after the heating operation using the demagnetizing heating roll.

This phenomenon will be described with reference to FIGS. 5(a)–5(c).

Figure 5A:
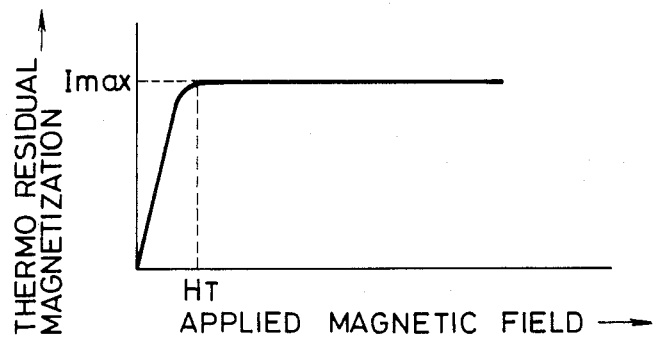
FIGS. 5(a)–5(e) are diagrams for describing the principles of demagnetization.
Figure 5B:
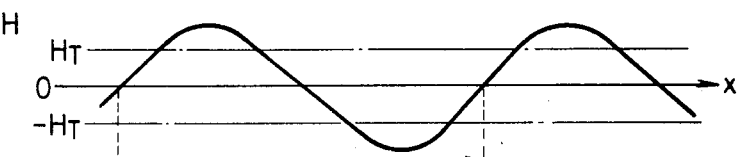
Figure 5C:
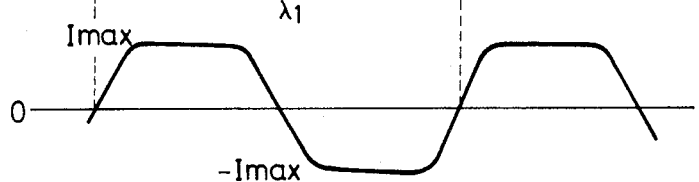

FIG. 5(a) indicates the relation between thermal residual magnetization and applied magnetic field. When the applied magnetic field is smaller than the threshold magnetic field $H_T$, the residual magnetization depends on the applied magnetic field; however, when applied magnetic field exceeds the threshold magnetic field $H_T$, the residual magnetization is substantially a constant value $I_{max}$. The value $H_T$ is a function of the heating temperature of the thermo-magnetic material. For instance, in the case of a commercially available chromium dioxide tape, when the heating temperature is set to higher than 130° C., $H_T$ is about 30 Öe, and the maximum thermal residual magnetization is $I_r \simeq 100$ G ($4\pi I_r \simeq 1200$ G).

Thermal magnetization in the formation of a magnetic latent image will now be described with reference to FIGS. 5(b) and 5(c). When the magnetization pattern formed over the entire first magnetic layer 1 has a spatial wavelength $\lambda_1$, the magnetic field acting on the second magnetic layer is as shown in FIG. 5(b). Accordingly, the portions of the second magnetic layer which are heated have a thermal residual magnetization as indicated in FIG. 5(c). By this magnetization, a magnetic field is produced on the free space side, thus causing the image visualizing particles to stick thereto.

Figure 5D:
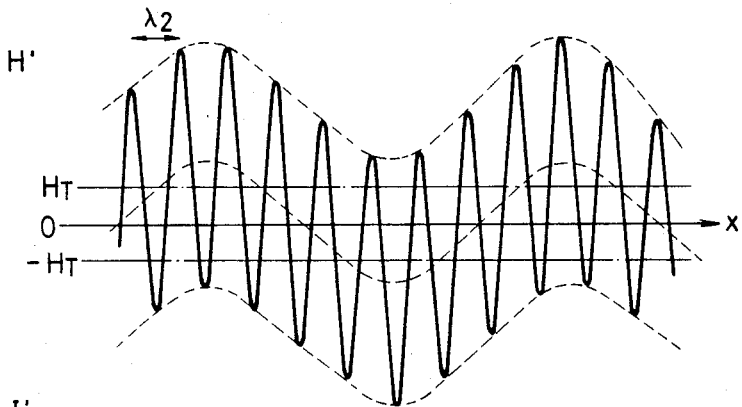

Now, let us consider thermal magnetization when a magnetic field having a spatial wavelength $\lambda_2$ smaller than the spatial wavelength $\lambda_1$ is applied (in an erasing operation). The composite magnetic field of the magnetic fields of the wavelengths $\lambda_1$ and $\lambda_2$, as shown in FIG. 5(d), acts on the second magnetic layer. It can be considered that the thermal residual magnetization with the composite magnetic field as shown in FIG. 5(d) is as indicated in FIG. 5(e).

Figure 5E:
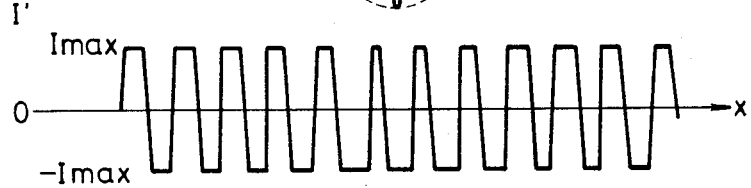

Let us consider the thermal residual magnetization in FIG. 5(e). It is possible to produce a magnetic field on the free space side; however, as the magnetization in the opposite direction exists closely in such a manner that it is adjacent thereto, the magnetic flux returns to the magnetic layer side before going away on the free space side. Accordingly, it can be considered that the magnetization of FIG. 5(e) cannot cause the image visualizing particles to stick.

As is apparent from the above description, in association with the erasing of the magnetization pattern, the demagnetizing heating roll operates to add the magnetic field from the first magnetic layer to a magnetic field having a smaller spatial wavelength, and to subject, under this condition, the second magnetic layer to thermal magnetization to the extent that magnetic adhesion of the image visualizing particles is not caused, thus achieving the erasing operation.

Accordingly, the demagnetizing heating roll may have a construction other than that shown in FIG. 3. That is, the heating roll may have any construction with which the temperature of the thermo-magnetic material is increased to a value at which the latter is subjected to thermal magnetization in its entirety, and wherein an erasing magnetic field, the wavelength of which is smaller than the modulation spatial wavelength (of the magnetization pattern formed over the first magnetic field) for the formation of a latent image is applied to the thermo-magnetic material.

Figure 6A:
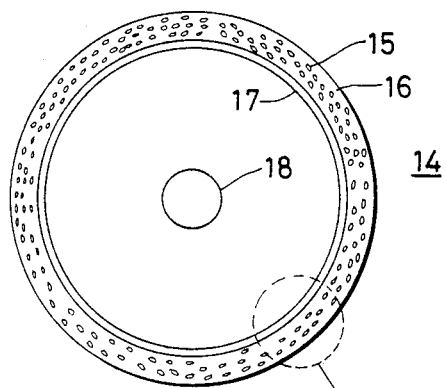
FIGS. 6(a) and 6(b) are diagrams showing one modification of the demagnetizing heating roll.
Figure 6B:
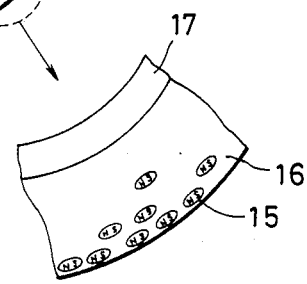

FIGS. 6(a) and 6(b) show one modification of the demagnetizing heating roll, which includes a heat source 18, a core 17, and a polymer layer 16 in which small permanent magnet elements, namely, ferromagnetic particles 15, are dispersed. FIG. 6(b) is an enlarged view of a part of the heating roll of FIG. 6(a).

Figure 7:
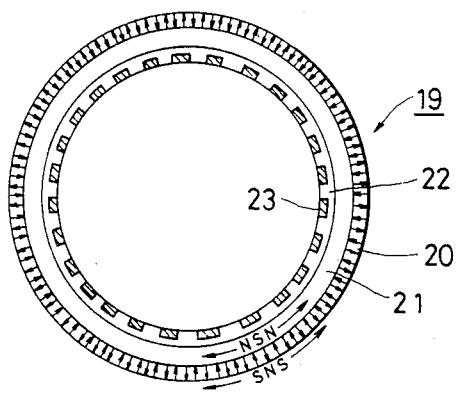
FIG. 7 is a diagram showing another modification of the demagnetizing heating roll.

FIG. 7 shows another modification of the demagnetizing heating roll, which includes a ferromagnetic layer 20 perpendicularly magnetized pattern; a core 21; an insulating layer 22; and resistance heating elements 23.

The magnetic element for producing the erasing magnetic field in these modifications may be made of any magnetic material if the magnetic characteristic of the latter is maintained unchanged near the thermo-magnetic operation temperature (such as the Curie temperature) of the second magnetic layer of the magnetic recording element of FIG. 1.

Only roll-shaped demagnetizing devices have been described; however, a demagnetizing device whose configuration is different from the above-described may be used if it can uniformly heat the thermo-magnetic recording medium and can apply an erasing magnetic field of small spatial wavelength thereto.

The erasing magnetic field will now be described in more detail. As was described with reference to FIGS. 5(a)–5(c), the erasing magnetic field is used to assist in the thermal magnetization of the second magnetic layer, which is a thermo-magnetic recording element, to a degree more dense than the first magnetic layer. It is desirable that the magnetic field be provided near the surface of the demagnetizing heating roll and be produced from a dense magnetization pattern which is moved together with the heating roll. The spatial modulation wavelength $\lambda_2$ of the magnetization pattern should be smaller than the wavelength $\lambda_1$ of the magnetization pattern which is formed in the first magnetic layer of the magnetic recording medium in FIG. 1. The most preferable relation between these wavelengths is:

$$\lambda_2 = \lambda_1/3$$

The value is suitably selected according to the size of the image visualizing particles (having an average grain size d) and the thickness of the layers of the magnetic recording medium. It is most preferable that $1 \ \mu m < \lambda_1 < 200 \ \mu m$ when $1 \ \mu m < d < 100 \ \mu m$. According to the various conditions, the erasing magnetization pattern is so selected as to meet $\lambda_2 = \lambda_1/3$.

The magnetization of the erasing magnetization pattern may be set to an optional value if the maximum value of the magnetic field acting on the second magnetic layer exceeds the magnetic field having the wavelength $\lambda_1$ from the first magnetic layer, under the erasing thermal magnetization operating conditions.

The invention will now be described further with reference to the following example.

EXAMPLE

Figure 8:
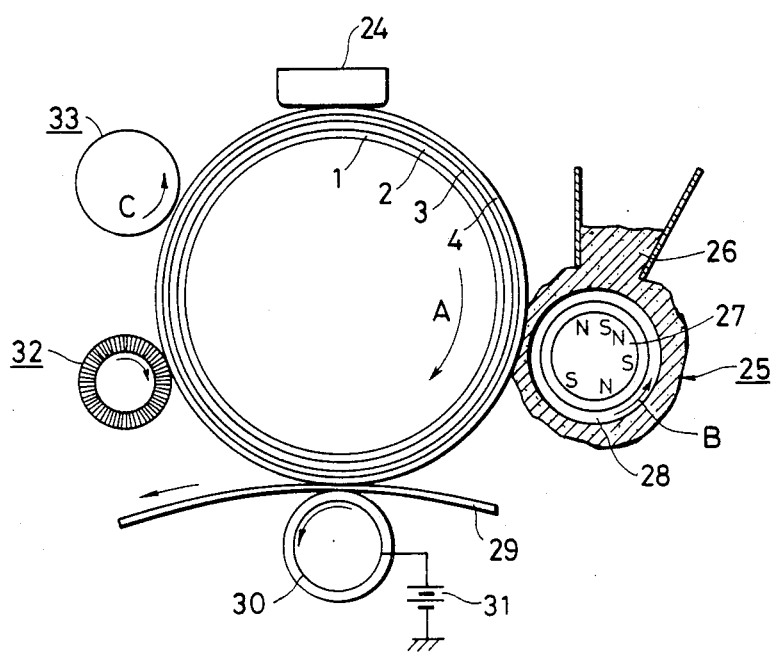
FIG. 8 is a diagram outlining the arrangement of one example of a magnetic recording apparatus with a demagnetizing heating roll which practices the magnetic latent image erasing method according to the invention.

FIG. 8 shows one example of a magnetic recording apparatus including a magnetic latent image carrier and a demagnetizing device. The magnetic recording medium includes a base layer (or an aluminum drum) 1; a first magnetic layer 2 which is a commercially available metal magnetic tape and which has a magnetization pattern formed over its entire surface by performing sinusoidal magnetization with a wavelength of $50\mu$ substantially to saturation; a non-magnetic intermediate layer 3 of polyimide having a thickness of 10 $\mu m$; and a second magnetic layer 4 having a thickness of 10 $\mu m$ which is not initially magnetized, the second magnetic layer 4 being prepared by dispersing chromium oxide in resin. A thermal head array 24 applies a thermal pattern corresponding to an image signal to the magnetic recording medium, which is turned.

A magnetic latent image corresponding to the thermal pattern thus applied is formed in the second magnetic layer 4, and is then brought to a developing unit 25 as the magnetic recording medium is turned. The developing unit 25 operates to supply developing particles to the magnetic latent image so that the particles adhere to the magnetic latent image. The particles are prepared by dispersing magnetic particles such as iron oxide particles in a binder resin. In the case of FIG. 8, the developing unit is a so-called magnetic brush developing unit in which a permanent magnet 27 having a suitable magnetic poles is inserted into an outer cylinder 28 which is turned in the direction of the arrow B to convey the developing particles.

The pattern made visual is brought into contact with a transferring member 29 such as a sheet, and is transferred electrostatically onto the member 29 by an electrode roll 39 to which an electrostatic bias means 31 of 300 V is connected.

The developing particles which remain without being transferred to the transferring member are cleaned by a suitable cleaning member such as a brush roll 32.

In succession, the magnetic latent image is erased by a demagnetizing heating roll 33.

In this example, the demagnetizing heating roll was that shown in FIG. 3. That is, a magnetic layer 9 prepared by dispersing $\gamma Fe_2O_3$ magnetic particles in thermally stable polymer (polyarylate) was coated on a polyimide film (not shown), which was bonded to the silicon resin layer 11 with silicon primer. The core 12 was made of aluminum. A quartz lamp 13 was arranged at the center of the roll. The magnetic layer 9 was uniform in the longitudinal direction of the roll (in the direction perpendicular to the surface of the drawing). A sinusoidal magnetization having a wavelength of 10 $\mu m$ was provided in the direction C of rotation of the roll.

When the surface temperature of the demagnetizing heating roll 3 was set to about 180° C. and was then brought into contact with the magnetic recording medium in the form of the drum, the portion of the drum which was processed (erased) by the demagnetizing heating roll appeared as if not developed; that is, the latent image was satisfactorily erased.

Latent images could be repeatedly formed on portions of the drum, which were processed (erased) by the heating roll, with the thermal head array.

What is claimed is:

1. A method of erasing a magnetic latent image from a thermally magnetized layer of a recording medium having a further magnetized layer storing a magnetization pattern, said method comprising the steps of:
    applying a magnetic field to said thermally magnetized layer; and
    simultaneously applying heat to said medium, at least a component of said magnetic field being produced from said magnetization pattern of said further magnetic layer.

2. A method as claimed in claim 1, said heat and said magnetic field thermally magnetizing said thermally magnetized layer.

3. A method as claimed in claim 2, wherein at least a portion of said magnetic field comprises a field originating externally of said recording medium.

4. A method of erasing a magnetic latent image, comprising: applying a synergic magnetic field to a thermally magnetized layer of a magnetic recording medium having a further magnetic layer, and simultaneously applying heat to said medium whereby said heat and said synergic magnetic field thermally magnetize said thermally magnetized layer, said synergic magnetic field being composed of at least a component of said further magnetic field and a field originating externally of said recording medium, said external field being applied by means of a roller having a predetermined magnetization pattern at the exterior surface thereof.

5. A method as claimed in claim 4, said heating of said medium being effected by said roller.

6. A method as claimed in claim 4, said external magnetic field changing with a period shorter than that of said periodic magnetization pattern in said further magnetic layer.

7. A method as claimed in claim 6, wherein wavelengths of said external field ($\lambda_2$) and said periodic magnetization pattern ($\lambda_1$) are selected such that $$\lambda_2 \leq \lambda_1/3.$$

8. A method as claimed in claim 5, wherein said roller is heated by internal resistance elements.

9. A method as claimed in claim 5, wherein said roller is heated by an infrared source.

10. A method as claimed in claim 4, said magnetization pattern of said roller being formed perpendicularly to a surface of said medium.

11. A method of erasing a magnetic latent image, comprising: applying a synergic magnetic field to a thermally magnetized layer of a magnetic recording medium having a further magnetic layer, and simultaneously applying heat to said medium, at least a a component of said synergic magnetic field derived from a periodic magnetization pattern formed in said magnetic layer.

* * * * *

UNITED STATES PATENT AND TRADEMARK OFFICE
CERTIFICATE OF CORRECTION

PATENT NO. : 4,503,438

DATED : March 5, 1985

INVENTOR(S) : Koichi SAITOH, et al.

It is certified that error appears in the above-identified patent and that said Letters Patent is hereby corrected as shown below:

At the first page of the patent please enter the following:

[30] Foreign Application Priority Data

August 28, 1981 [JP] Japan. . . . 56-134262

Signed and Sealed this

Tenth Day of September 1985

[SEAL]

Attest:

DONALD J. QUIGG

Attesting Officer    Acting Commissioner of Patents and Trademarks - Designate